United States Patent
Pogorelsky

(10) Patent No.: US 11,304,788 B2
(45) Date of Patent: Apr. 19, 2022

(54) LIGHT CONCENTRATING ADAPTER FOR DENTAL CURING

(71) Applicant: OrthoSnap Corp., Westbury, NY (US)

(72) Inventor: Yan Pogorelsky, Westbury, NY (US)

(73) Assignee: ORTHOSNAP CORP., Westbury, NY (US)

( * ) Notice: Subject to any disclaimer, the term of this patent is extended or adjusted under 35 U.S.C. 154(b) by 120 days.

(21) Appl. No.: 16/676,697

(22) Filed: Nov. 7, 2019

(65) Prior Publication Data
US 2021/0137662 A1 May 13, 2021

(51) Int. Cl.
*A61C 13/15* (2006.01)
*A61C 7/08* (2006.01)

(52) U.S. Cl.
CPC .............. *A61C 19/003* (2013.01); *A61C 7/08* (2013.01)

(58) Field of Classification Search
CPC ....... A61C 1/0046; A61C 7/02; A61C 17/084; A61C 9/0053; A61C 11/0015; A61C 1/24; A61C 1/247; A61C 19/003; A61C 19/004; A61C 19/06; A61B 1/24; A61B 1/247; A61B 90/30; A61B 5/0088; A61B 5/4547; G02F 1/0105; G02F 1/011; G02F 1/133606
USPC ......................... 433/29; 607/88–95; 606/2–19
See application file for complete search history.

(56) References Cited

U.S. PATENT DOCUMENTS

| | | | | |
|---|---|---|---|---|
| 4,445,858 A * | 5/1984 | Johnson | ............... | A61C 19/004 433/141 |
| 4,522,594 A * | 6/1985 | Stark | .................... | A61C 19/004 433/141 |
| 5,290,169 A * | 3/1994 | Friedman | ............. | G02B 6/4298 433/229 |
| 5,927,978 A * | 7/1999 | Muller | ..................... | A61C 5/00 433/141 |
| 6,454,129 B1 * | 9/2002 | Green | .................. | B65D 81/325 222/105 |
| 6,511,321 B1 * | 1/2003 | Trushkowsky | .......... | A61C 3/08 433/164 |
| 6,733,493 B2 * | 5/2004 | Gruzdev | .......... | A61B 5/150358 606/9 |
| 6,790,205 B1 * | 9/2004 | Yamazaki | ............ | A61B 18/203 606/11 |
| 7,604,630 B2 * | 10/2009 | Jun | ....................... | A61B 18/203 606/9 |
| 7,677,888 B1 * | 3/2010 | Halm | .................... | A61C 19/004 433/29 |
| 8,002,546 B2 * | 8/2011 | Viscomi | .................. | A61C 3/00 433/141 |
| 2002/0133970 A1 * | 9/2002 | Gordon | ................ | A61C 19/004 34/250 |
| 2004/0214130 A1 * | 10/2004 | Fischer | ................ | A61C 19/004 433/29 |

(Continued)

*Primary Examiner* — Yogesh P Patel
(74) *Attorney, Agent, or Firm* — Buckley, Maschoff & Talwalker LLC

(57) ABSTRACT

Provided herein is an adapter for a dental curing light. The adapter can restrict or otherwise concentrate light as it is emitted from the dental curing light making the beam of light more focused to a specific portion of a tooth rather than radiating an entire tooth. The adapter can have different customizable shapes and sizes which is beneficial for adhering attachments commonly used with orthodontic aligners to a tooth.

17 Claims, 4 Drawing Sheets

(56) References Cited

U.S. PATENT DOCUMENTS

| | | | |
|---|---|---|---|
| 2006/0115783 A1* | 6/2006 | McLaren | A61C 19/004 433/29 |
| 2006/0199144 A1* | 9/2006 | Liu | A61C 19/004 433/29 |
| 2008/0014559 A1* | 1/2008 | Love | A61C 19/004 433/226 |
| 2008/0057463 A1* | 3/2008 | Wong | A61K 6/884 433/29 |
| 2011/0059415 A1* | 3/2011 | Kasenbacher | A61C 1/0046 433/29 |
| 2013/0323683 A1* | 12/2013 | Piergallini | A61C 1/088 433/215 |
| 2015/0050613 A1* | 2/2015 | Berkely | A61C 17/0217 433/29 |
| 2019/0117358 A1* | 4/2019 | Rohner | A61C 3/00 |

* cited by examiner

LIGHT CONCENTRATING ADAPTER FOR DENTAL CURING

BACKGROUND

Orthodontic aligners are an alternative to traditional metal braces. Orthodontic aligners consist of removable trays, often made of clear plastic material, which fit over the teeth. Because the aligners are typically made of a clear plastic material, the aligners are considered invisible. A typical use case requires a set of trays which are used in sequence (e.g., for one to two weeks at a time) and which slowly move the teeth. The trays can be designed using state-of-the art techniques based on models and/or images of the teeth. Often, the trays are generated using three-dimensional (3D) printing. The aligners work because slight changes provided by the sequence of trays gradually shifts the teeth to a desired place.

Some of the benefits of aligners include that they are removable allowing for eating, drinking, brushing, flossing, etc., without interruptions. In addition, aligners are made with smooth edges which are comfortable instead of metal braces which often have rough edges making them uncomfortable. However, some of the drawbacks of aligners is that they are not secured to the teeth like metal braces which means their ability to move teeth may be limited. To increase the power of the aligners, attachments may be added to the teeth. Attachments are much smaller than the tooth itself, but are typically cured using a traditional ultraviolet dental curing light. This process can be inefficient since the dental curing light/lamp is a bulk curing tool that provides a broad dispersion of light to cover as much as surface as possible. This can result in an "overflash" which not only cures the intended area but unintended surrounding areas as well.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
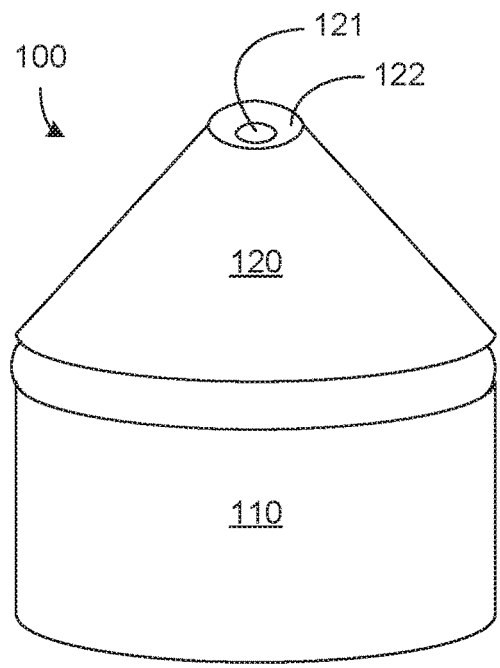
FIGS. 1A-1C are diagrams illustrating perspective views of an adapter which can be attached to a dental curing light accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Some tooth movements can be difficult to accomplish with a plastic orthodontic aligner by itself. For example, an extrusion (pulling the tooth away from the gum line), a rotation (torqueing the tooth with rotational movement), and the like, are some common examples. To increase surface friction between the tooth and the aligner and make such tooth movements easier to accomplish such as in the case of an extrusion, etc., an attachment or series of attachments can be adhered to the tooth. An attachment is a small bump made of a composite material which can be cured to the surface of the tooth using ultraviolet light. The attachment (or multiple attachments) can provide an anchor point that can increase the surface friction between the plastic aligner and the tooth making it easier for the aligner to do its job.

The attachment consists of the same composite material used in fillings and other dental procedures. Typically, a template (also referred to herein as a matrix) is loaded with composite material in the desired location and amount of the attachment. The template is then placed over the tooth and cured using a UV dental curing light tool. The head of the curing light tool is designed to broadly disperse light such that an entire tooth is radiated at the same time. This can be beneficial when curing a filling inside the tooth.

However, an attachment can be significantly smaller in size than the tooth itself. The attachments can come in different shapes and sizes including, but not limited to, diamonds, semi-circles, triangles, rectangles, and the like. In some cases, attachments are designed with customized shapes based on the tooth, the procedure to perform, and the like. In addition, a dental professional adding the attachment may often add too much composite (even by just a little amount). In this situation, because the curing light tool emits light in an unconcentrated manner that broadly expands in all directions (referred to herein as overflash), excess composite is often adhered to the surface of the tooth making cleanup a difficult job.

The example embodiments improve the performance of the orthodontic attachment process for orthodontic aligners through the use of a light concentrating adapter (also referred to herein as a nozzle). The adapter may attach to an end of the curing light tool that emits curing light that is used to harden fillings, restorations, attachments, etc. Namely, the light concentrating adapter can prevent over flash when curing a dental attachment to a surface of a tooth. The adapter described herein may be customized to have a corresponding shape of an attachment. For example, if the shape of the attachment is a semicircle, the shape of the light-emitting opening of the adapter may likewise be a semicircle. Furthermore, the adapter can focus light onto a smaller area than the unfocused light being emitted by the traditional UV light tool. The adapter is designed to be pulled over an exterior surface of a distal end of a light curing tool by a user. Once attached, light is emitted out of the adapter instead of the lamp surface. The resulting light is more focused onto a tooth surface (or template holding the attachment) without any over flash.

The adapter can restrict the dispersion of light as it is emitted from the dental curing light making the beam of light more focused at a specific portion of a tooth rather than radiating an entire tooth. The adapter can have different customizable shapes and sizes which is beneficial for adhering attachments commonly used with orthodontic aligners to a tooth.

An orthodontic aligner is a tray which is molded to fit the shape of a user's teeth. The matrix/template which is used to add attachments to the user's teeth is similar to the orthodontic aligner with recesses there for composite material. The matrix can be printed/designed with recesses at specific locations and specific sizes according to the attachments to be adhered to the user. Once loaded with composite, the matrix can be placed over the surface of the teeth, and a dental professional can use the curing light tool to harden the composite. Because the adapter described herein reduces a dispersion of the light from the dental curing tool, there is no over curing. In addition, if too much composite is added to the template (overloaded or flowing out the sides), which is very common, the dental curing light will not cure the additional composite because it is fitted for the specific attachment. Therefore, the excess composite can be easily wiped away after curing. This makes the cleanup process much easier.

Figure 1B:
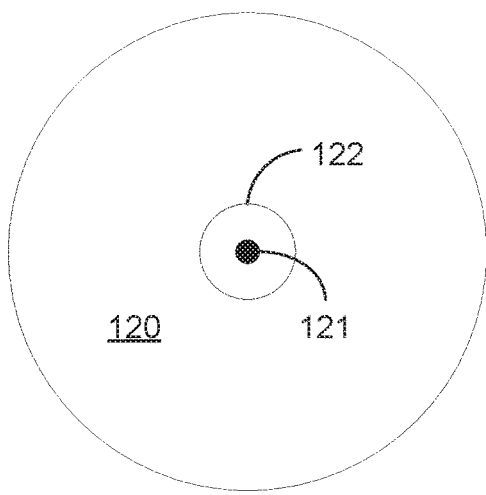
Figure 1C:
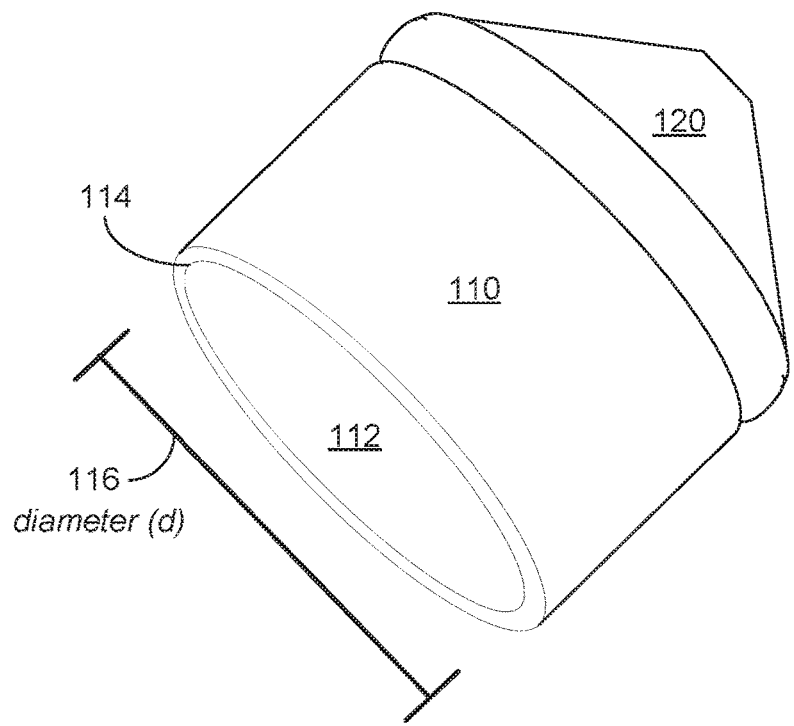

FIGS. 1A-1C illustrate perspective views of an adapter 100 which can be attached to a dental curing light tool in accordance with an example embodiment. Referring to FIGS. 1A-1C, the adapter 100 includes a body 110 and a head 120. In some embodiments, the body 110 and the head 120 may be of uniform construction formed of material, for example, polymer, rubber, plastic, and the like. At a top of the head 120, the adapter 100 includes a light concentrating opening 121 (also referred to herein as a light emitting opening). The light concentrating opening 121 may be disposed inside a recess 122 which is disposed in a central area of the head 120 as shown in the top-perspective view of the adapter 100 in FIG. 1B. Here, both the recess 122 and the light concentrating opening 121 have a same shape as one another which in this example is a circle. It should also be appreciated that the opening 121 and the recess 122 may be of a rectangle, a semicircle, a triangle, a rectangle, a diamond, and the like.

As shown in the side-perspective view of the adapter 100 in FIG. 1A, the recess 122 is a depression on a surface of the head 120. The head 120 may be constructed of a firm but still somewhat flexible rubber or similar material. In this example, when the head 120 is placed in contact with a surface of a user's tooth, the light may emit from the light concentrating opening 121 while the recess 122 may prevent light from escaping out of the concentrated beam since. Here, the most pronounced portion of the recess 121 may contact the surface of the user's tooth preventing light from escaping the depressed area created by the recess 122.

FIG. 1C shows an underneath perspective of the adapter 100. In particular, the body 110 may be hollow and allow for the distal end of a dental curing light tool to be inserted therein. In this example, the body 110 includes a securing opening 114 and interior walls 112. A diameter (d) 116 of the securing opening 114 and the interior walls 112 of the body 110 may be the same. The diameter of the light curing tool 110 may be different. Here, the head 120 is disposed on an end of the adapter 100 which is opposite to an end of the adapter 100 which includes the body 110 housing the securing opening 114. The securing opening 114 and the light concentrating opening 121 may be aligned on the same axis. However, the diameter 116 of the securing opening 114 may be substantially larger than a diameter of the light concentrating opening 121, for example, 10 times larger, 20 times larger, 30 times larger, and the like.

Figure 2A:
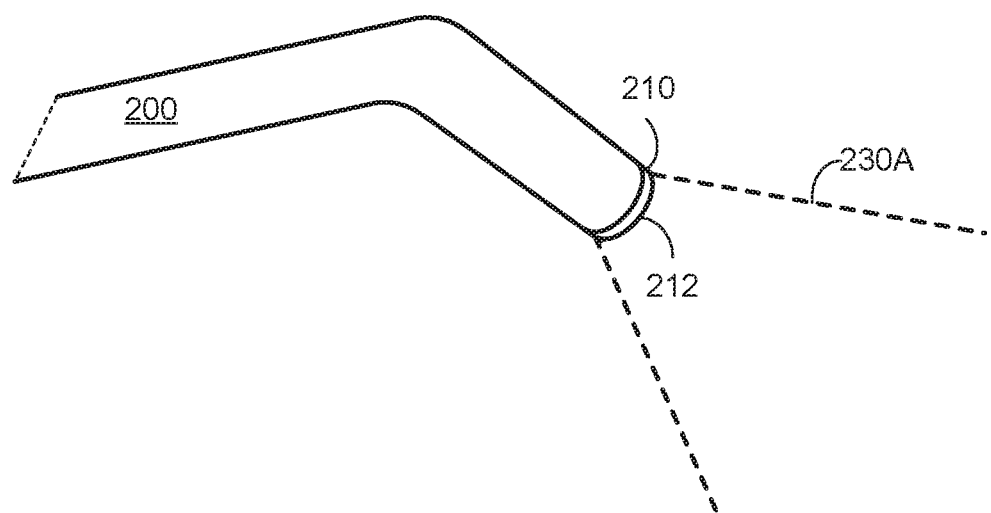
FIGS. 2A-2B are diagrams illustrating an ultraviolet dental curing light with an adapter attached in accordance with an example embodiment.
Figure 2B:
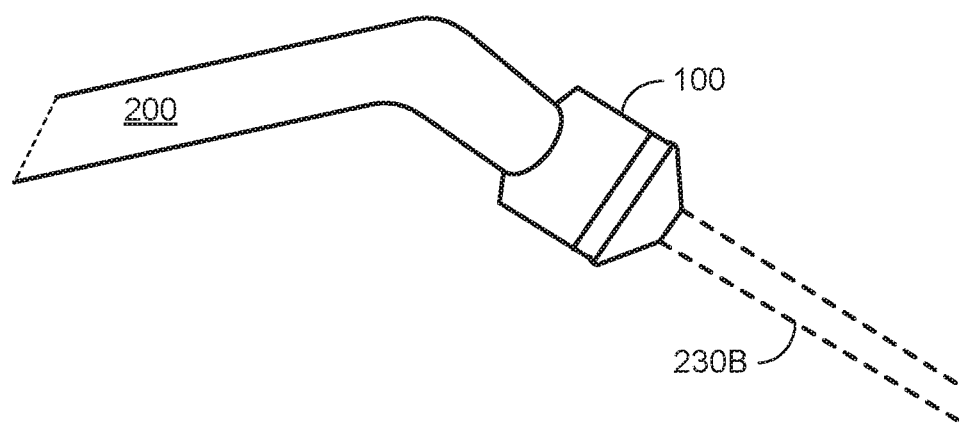

For example, some tools in the art have a 9 mm diameter, an 11 mm diameter, and the like. Referring to FIGS. 1A-1C and 2A-2B, the size of the diameter 116 of the adapter 100 may be customized depending on its use such that it can be securely affixed to an end 210 of a light curing tool 200. For example, the diameter 116 may be equal to or less than 9 mm to enable the adapter 100 to be placed around an edge of a 9 mm wide diameter light curing tool. As another example, the diameter 116 may be equal to or less than 11 mm to enable the adapter to be placed around an edge of a 11 mm wide diameter light curing tool. Furthermore, if the diameter 116 is slightly smaller (e.g., 0.2 mm, 0.5 mm, etc.) than the diameter of the light curing tool, the flexible nature of the material of the body 110 may create an elastic force from the interior walls 112 onto the exterior surface of the light emitting tool thereby securely fastening the adapter 100 to the end of the light curing tool as shown in the examples of FIG. 2A-2B.

As shown in FIG. 2A, the arm of the light curing tool 200 includes a distal end 210 which also includes an ultraviolet layer 212 which emits ultraviolet light in a beam pattern 230A. Here, the beam pattern 230 is broadly dispersed. Meanwhile, as shown in FIG. 2B, the light curing tool 200 includes the adapter 100 shown in FIGS. 1A-1C attached around the surface of the distal end 210 of the light curing tool 210. The hollow portion (body 110) of the adapter 100 is long enough such that the body 110 of the adapter 100 completely covers the ultraviolet layer 212. For example, the body 110 may have a hollowed out length of 5 mm, 7 mm, 10 mm, 12 mm, 15 mm, or the like. Therefore, the distal end 210 of the light curing tool 200 may be inserted into the body 110 of the adapter in an amount that corresponds to the hollowed out length of the body 110.

Furthermore, as shown in FIG. 2B, light from the ultraviolet layer 212 is concentrated by the adapter 100 into a concentrated beam pattern 230B. Here, the light passes out of the light concentrating opening 121 shown in FIGS. 1A and 1B, which is significantly smaller than a size of the ultraviolet layer 212 of the light curing tool 200. As a result, light from the light curing tool 200 may be more sharply focused onto a surface of the tooth.

Figure 3A:
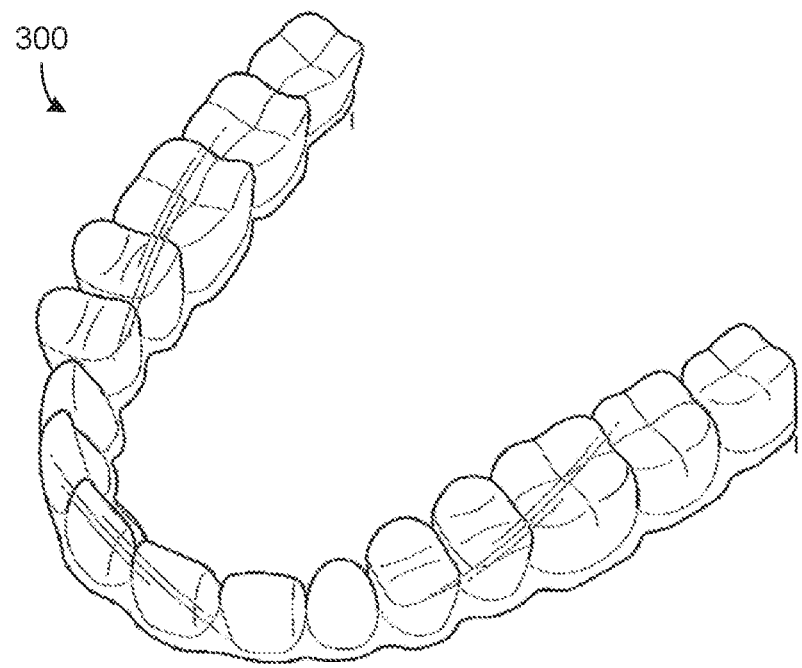
FIG. 3A is a diagram illustrating an example of a dental aligner including dental attachments in accordance with an example embodiment.

FIG. 3A illustrates an example of a dental aligner 300 which may be placed over a person's teeth in accordance with an example embodiment. The dental aligner 300 may include a clear orthodontic aligner that is made of a plastic material and which can move teeth over periods of time. The dental aligner 300 may be one phase among a plurality of phases. Every few weeks a new dental aligner 300 may be used to replace the old one as the teeth slowly move. The dental aligner 300 may also be referred to as clear braces.

Figure 3B:
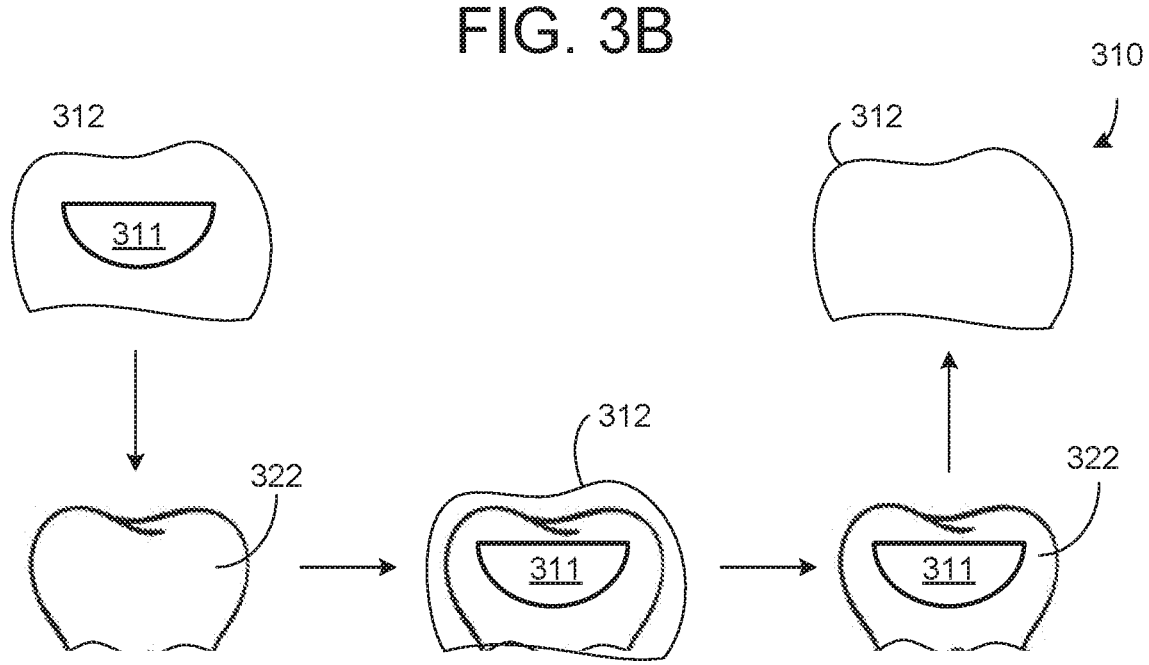
FIG. 3B is a diagram illustrating a process of curing an attachment to a tooth, in accordance with an example embodiment.

FIG. 3B illustrates a process 310 of curing an attachment 311 to a tooth 322 using a matrix 312 filled with composite material in accordance with an example embodiment. The matrix 312 may be part of a larger piece that may cover an entire bottom or top portion of teeth, however, for convenience of example, a matrix for one tooth is shown for simplicity. The matrix 312 may include one or more recesses which can hold composite materials therein corresponding to the attachments. A user may apply the composite material into the recess.

In the example of FIG. 3B, a composite material is added to a recess within the matrix 312 to create the attachment 311 which is a small composite structure to be adhered to the outside of a tooth 322. To adhere the attachment 311 to the tooth 322, the matrix 312 may be placed over the tooth 322. Next, a dental curing tool (UVE) may be used to cure the composite material within the recess of the attachment 311. Once the attachment 311 is cured to the tooth 322, the matrix 312 may be removed from the tooth 322. Furthermore, although not shown, the dental aligner 300 may be placed over the tooth 322 including the attachment 311 adhered thereto. The use of the attachment 311 may provide for greater amounts of surface friction between the dental aligner 300 and the surface of the tooth 322.

Figure 4:
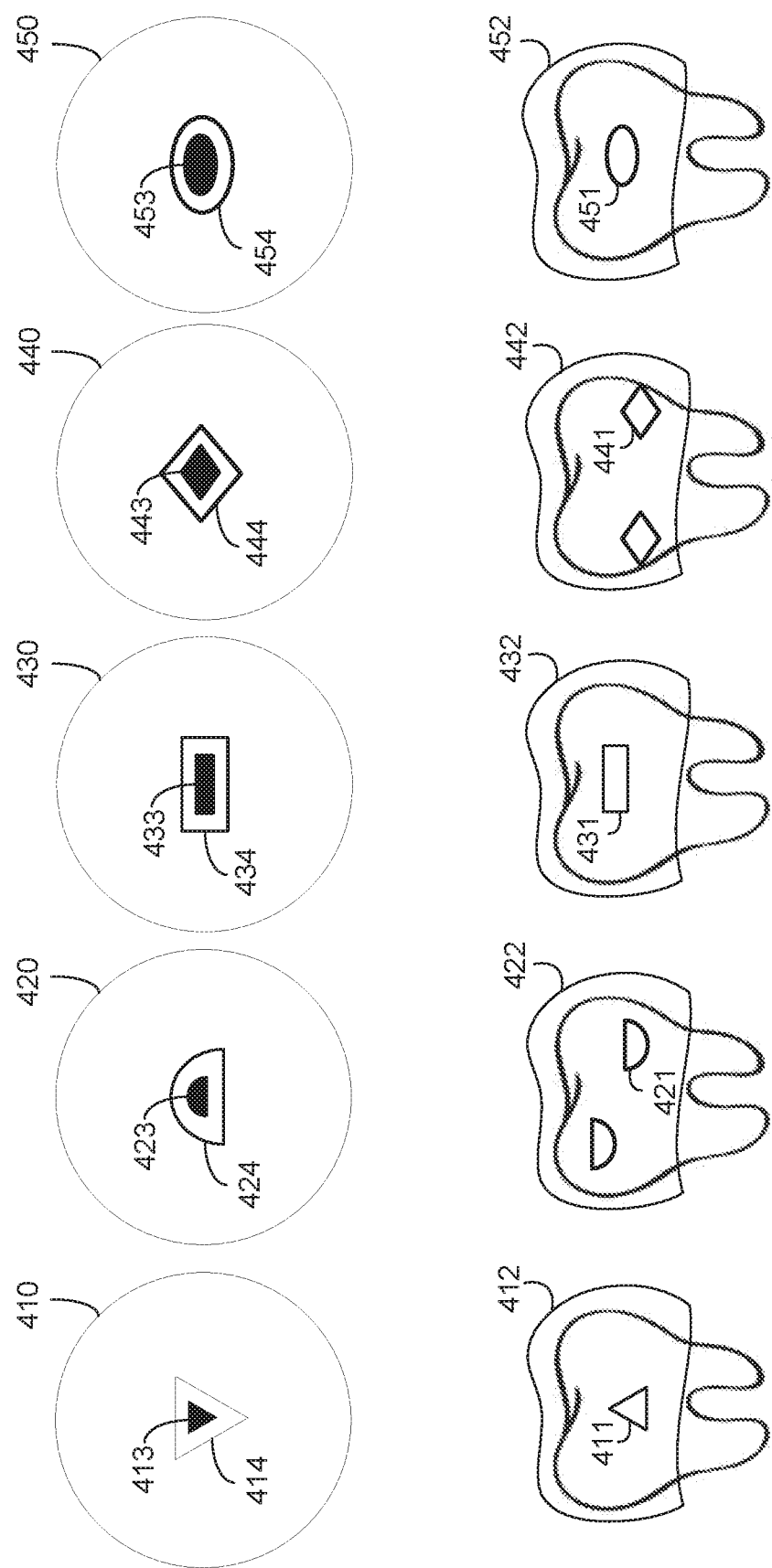
FIG. 4 is a diagram illustrating examples of dental composite shapes and corresponding adapter shapes in accordance with an example embodiment.

FIG. 4 illustrates some examples of attachment shapes and corresponding adapter shapes in accordance with an example embodiment. Referring to FIG. 4, five examples of a tooth being treated with an orthodontic attachment are shown. For example, a triangular attachment 411 is attached to a tooth using an adapter 410 which includes a triangular-shaped light concentrating hole 413. Here, the triangular attachment 411 is embedded into a template (matrix 412) and placed over the tooth. A dental curing light (not shown) may have attached thereto the adapter 410 including the triangular-shaped light concentrating hole 413 which can be used to concentrate light from the lamp directly onto the triangular attachment 411 to adhere it to the tooth. Once the triangular attachment 411 has been adhered to the tooth, the matrix 412 may be removed and an aligner (not shown) may be placed over the tooth. In addition, a recess 414 of the adapter 410 may be the same shape as the triangular-shaped light concentrating hole 413 to prevent light from spilling over when applied to the tooth.

As another example, a semicircle attachment 421 is attached to a tooth using an adapter 420 which includes a semicircular-shaped light concentrating hole 423. Here, multiple semicircle attachments 421 are embedded into a matrix 422 and placed over the tooth. A dental curing light (not shown) may have attached thereto the adapter 420 including the semicircular-shaped light concentrating hole 423 which can be used to concentrate light from the lamp directly onto the semicircle attachments 421, respectively, to adhere them to the tooth. Once the semicircle attachments 421 have been adhered to the tooth, the matrix 422 may be removed and an aligner (not shown) may be placed over the tooth. In addition, a recess 424 of the adapter 420 may be the same shape as the semicircular-shaped light concentrating hole 423 to prevent light from spilling over when applied to the tooth.

As another example, a rectangular attachment 431 is attached to a tooth using an adapter 430 which includes a rectangular-shaped light concentrating hole 433. Here, the rectangular attachment 431 is embedded into a matrix 432 and placed over the tooth. A dental curing light (not shown) may have attached thereto the adapter 430 including the rectangular-shaped light concentrating hole 433 which can be used to concentrate light from the lamp directly onto the rectangular attachment 431 to adhere it to the tooth. Once the rectangular attachment 431 has been adhered to the tooth, the matrix 432 may be removed and an aligner (not shown) may be placed over the tooth. In addition, a recess 434 of the adapter 430 may be the same shape as the rectangular-shaped light concentrating hole 433 to prevent light from spilling over when applied to the tooth.

As another example, a diamond attachment 441 is attached to a tooth using an adapter 440 which includes a diamond-shaped light concentrating hole 443. Here, multiple diamond attachments 441 are embedded into a matrix 442 and placed over the tooth. A dental curing light (not shown) may have attached thereto the adapter 440 including the semicircle-shaped light concentrating hole 443 which can be used to concentrate light from the lamp directly onto the diamond attachments 441, respectively, to adhere them to the tooth. Once the diamond attachments 441 have been adhered to the tooth, the matrix 442 may be removed and an aligner (not shown) may be placed over the tooth. In addition, a recess 444 of the adapter 440 may be the same shape as the diamond-shaped light concentrating hole 443 to prevent light from spilling over when applied to the tooth.

As another example, an elliptical attachment 451 is attached to a tooth using an adapter 450 which includes an elliptical-shaped light concentrating hole 453. Here, the elliptical attachment 451 is embedded into a matrix 452 and placed over the tooth. A dental curing light (not shown) may have attached thereto the adapter 450 including the rectangular-shaped light concentrating hole 453 which can be used to concentrate light from the lamp directly onto the elliptical attachment 451 to adhere it to the tooth. Once the elliptical attachment 451 has been adhered to the tooth, the matrix 452 may be removed and an aligner (not shown) may be placed over the tooth. In addition, a recess 454 of the adapter 450 may be the same shape as the elliptical-shaped light concentrating hole 453 to prevent light from spilling over when applied to the tooth.

As described herein, the adapter, also referred to as a nozzle, may be attached or otherwise fixedly secured around an outer surface of a distal end of a UV curing lamp and may concentrate or otherwise focus light from the lamp onto a specific part of the tooth. A typical UV lamp provides a broad dispersion of light to cover as much surface as possible (bulk curing). Meanwhile, the adapter described herein allows for specific portions/areas of a tooth, but not the entire tooth, to be cured. The adapter can be designed with a customizable shape that concentrates the shape of the light into different customizable shapes. Any overflash is prevented and overfilled composite is not cured making it easy for cleanup. The adapter attaches on to the end of the light. The adapter may be constructed of rubber. Because lamps come in different sizes (9 mm-11 mm) in diameter, a diameter of the adapter body and securing opening may come in different corresponding sizes.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a dental attachment comprising a size that is smaller than a tooth and that is configured to attach to a surface of the tooth, wherein an outer boundary of the dental attachment comprises a shape of one of a diamond, a semi-circle, a rectangle, a triangle, and an ellipse; and
   an adapter comprising:
      a hollow body;
      a securing opening disposed on an end of the hollow body and configured to fit around a distal end of a dental curing light tool that applies curing light to the dental attachment when attaching the dental attachment to the surface of the tooth;
an adapter head disposed at an opposite end of the adapter with respect to the end including the securing opening;
a light concentrating opening integrated within the adapter head, wherein the light concentrating opening is smaller than the tooth and comprises a same shape as the shape of the outer boundary of the dental attachment; and
a recess comprising a same shape as the shape of the outer boundary of the dental attachment, wherein the recess is positioned around the light concentrating opening and prevents light from leaving the light concentrating opening when the adapter head is in contact with the surface of the tooth.

2. The system of claim 1, wherein the securing opening comprises a circular shape and the hollow body comprises a corresponding circular wall that fits securely around a distal end of a dental curing light tool.

3. The system of claim 2, wherein a diameter of the securing opening and the hollow body comprise a common size that is less than or equal to 9 mm.

4. The system of claim 2, wherein a diameter of the securing opening and the hollow body comprise a common size that is less than or equal to 11 mm.

5. The system of claim 1, wherein the light concentrating opening is disposed within an interior of the recess.

6. The system of claim 5, wherein the light concentrating opening and the recess comprise a same shape.

7. The system of claim 1, wherein the light concentrating opening within the adapter head comprises a semi-circular-shaped hole.

8. The system of claim 1, wherein the light concentrating opening within the adapter comprises a diamond-shaped hole.

9. The system of claim 1, wherein the light concentrating opening within the adapter head comprises at least one of a circular-shaped hole, a triangular-shaped hole, and a rectangular-shaped hole.

10. A system comprising:
a dental attachment comprising a shape that is smaller than a tooth and that is configured to attach to a surface of the tooth, wherein an outer boundary of the dental attachment comprises a shape of one of a diamond, a semi-circle, a rectangle, a triangle, and an ellipse; and
a nozzle comprising:
a hollow body;
a securing opening disposed on a bottom of the hollow body, wherein the securing opening and a portion of the hollow body are configured to fit securely around a distal end of a dental curing light tool that applies curing light to the dental attachment when attaching the dental attachment to the tooth;
a head disposed on a top of the hollow body at an opposite end with respect to the securing opening; and
a light emitting opening within the head which is configured to concentrate a beam shape of the dental curing light tool onto a surface of a tooth, wherein the light emitting opening is smaller than the tooth and comprises a same shape as the shape of the outer boundary of the dental attachment; and
a recess comprising a same shape as the shape of the outer boundary of the dental attachment, wherein the recess is positioned around the light concentrating opening and prevents light from leaving the light concentrating opening when the adapter is in contact with the surface of the tooth.

11. The system of claim 10, wherein the securing opening comprises a circular opening to receive a distal end of the dental curing light tool and surrounding walls of the hollow body fit securely around the distal end of a dental curing light tool.

12. The system of claim 11, wherein a diameter of the hollow body and the securing opening comprise a shared size that is less than or equal to 9 mm.

13. The system of claim 11, wherein a diameter of the hollow body and the securing opening comprise a shared size that is less than or equal to 11 mm.

14. The system of claim 10, wherein the head comprises a conical shaped head with a recess disposed in a central portion the conical shaped head.

15. The system of claim 10, wherein the light emitting opening is disposed within an interior of the recess.

16. The system of claim 10, wherein the light emitting opening comprises a semi-circular-shaped hole.

17. The system of claim 10, wherein the light emitting opening comprises a diamond-shaped hole.

* * * * *